United States Patent
Thomas et al.

(10) Patent No.: US 10,082,085 B2
(45) Date of Patent: Sep. 25, 2018

(54) SEAL FOR GAS TURBINE ENGINES

(71) Applicants: Rolls-Royce Corporation, Indianapolis, IN (US); Rolls-Royce North American Technologies, Inc., Indianapolis, IN (US)

(72) Inventors: David J. Thomas, Brownsburg, IN (US); Ted J. Freeman, Danville, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 380 days.

(21) Appl. No.: 14/543,398

(22) Filed: Nov. 17, 2014

(65) Prior Publication Data

US 2015/0167557 A1 Jun. 18, 2015

Related U.S. Application Data

(60) Provisional application No. 61/917,002, filed on Dec. 17, 2013.

(51) Int. Cl.
| | | |
|---|---|---|
| F02C 7/28 | (2006.01) | |
| F02C 7/20 | (2006.01) | |
| F01D 5/28 | (2006.01) | |
| F01D 11/00 | (2006.01) | |

(52) U.S. Cl.
CPC ............... *F02C 7/28* (2013.01); *F01D 5/282* (2013.01); *F01D 11/005* (2013.01); *F02C 7/20* (2013.01); *Y02T 50/672* (2013.01)

(58) Field of Classification Search
CPC .... F01D 11/005; F01D 11/001; F01D 11/008; F01D 11/12; F16J 15/021; F16J 15/028; F23R 3/007; F23D 2212/10; F23D 2900/00018
See application file for complete search history.

(56) References Cited

U.S. PATENT DOCUMENTS

| | | | |
|---|---|---|---|
| 4,457,523 A | * | 7/1984 | Halling .................. F16J 15/021 |
| | | | 277/644 |
| 4,917,302 A | | 4/1990 | Steinetz et al. |
| 5,014,917 A | | 5/1991 | Sirocky et al. |
| 5,188,506 A | | 2/1993 | Creevy |
| 7,090,459 B2 | | 8/2006 | Bhate et al. |
| 7,229,246 B2 | | 6/2007 | Ghasripoor et al. |

(Continued)

FOREIGN PATENT DOCUMENTS

| | | |
|---|---|---|
| EP | 1582699 A1 | 10/2005 |
| EP | 2574731 A2 | 4/2013 |

OTHER PUBLICATIONS

European Search Report and Written Opinion, European Application No. 14195163.2-1610, dated Apr. 9, 2015.

*Primary Examiner* — Craig Kim
*Assistant Examiner* — Katheryn Malatek
(74) *Attorney, Agent, or Firm* — Barnes & Thornburg LLP

(57) ABSTRACT

A gas turbine engine assembly includes a support component, an engine component, and a seal. The annular support component is formed to include a notch. The engine component is mounted in spaced-apart relation to the support component so that a gap is formed between the support component and the engine component. The seal is located in the notch and is adapted to close the gap.

7 Claims, 2 Drawing Sheets

(56) References Cited

U.S. PATENT DOCUMENTS

| | | |
|---|---|---|
| 7,347,425 B2 | 3/2008 | James |
| 7,435,049 B2 | 10/2008 | Ghasripoor et al. |
| 7,451,989 B1 * | 11/2008 | Cornett ................ F16J 15/0806 |
| | | 277/626 |
| 7,497,443 B1 | 3/2009 | Steinetz et al. |
| 7,520,718 B2 | 4/2009 | Engle |
| 7,784,264 B2 | 8/2010 | Weaver et al. |
| 8,157,511 B2 | 4/2012 | Pietrobon et al. |
| 8,322,976 B2 | 12/2012 | Chila et al. |
| 2005/0220611 A1 * | 10/2005 | Bhate .................... F01D 11/025 |
| | | 415/173.3 |
| 2009/0169370 A1 | 7/2009 | Morgan et al. |
| 2011/0140370 A1 | 6/2011 | Sutcu |
| 2013/0280048 A1 * | 10/2013 | Ram .................... F01D 11/001 |
| | | 415/173.1 |

\* cited by examiner

SEAL FOR GAS TURBINE ENGINES

CROSS REFERENCE TO RELATED APPLICATIONS

This application claims priority to and the benefit of U.S. Provisional Patent Application No. 61/917,002, filed 17 Dec. 2013, the disclosure of which is now expressly incorporated herein by reference.

FIELD OF THE DISCLOSURE

The present disclosure relates generally to gas turbine engines, and more specifically to seals used in gas turbine engines.

BACKGROUND

Gas turbine engines are used to power aircraft, watercraft, power generators, and the like. Adjacent components in a gas turbine engine are often separated by a small gap. The small gap allows for variations in manufacturing tolerance of the adjacent components and for expansion/contraction of the components that occurs during operation of the gas turbine engine. Expansion and contraction of the adjacent components is typically caused by the selection of different materials for each component and by different temperatures experienced by each component.

The small gaps between adjacent components may be sealed to prevent the leakage of air through the small gaps during operation of the turbine engine. Seals used to block the leakage of air through the small gaps are sometimes designed to account for changes in the dimension of the gap to be closed. Rope seals are a type of compliant seal sometimes considered for blocking gaps between adjacent components. In some situations however, rope seals may not provide enough compliance and/or resilience to account for the amount of change in the dimension of the gap to be closed.

SUMMARY

The present disclosure may comprise one or more of the following features and combinations thereof.

A gas turbine engine assembly may include an support component, an engine component, and a seal. The support component may be formed to include a notch. The engine component may be mounted in spaced-apart relation to the support component so that a gap is formed between the support component and the engine component and so that the notch opens into the gap. The seal may be adapted to close the gap.

In some embodiments, the seal may include a rope gasket and a rope-biasing clip. The rope gasket may engage the support component and the engine component to block gasses from passing through the gap. The rope-biasing clip may be arranged between the support component and the rope gasket to push the rope gasket toward engagement with the support component and the engine component.

In some embodiments, the support component may be made from a metallic material and the engine component may be made from a composite material adapted to withstand high-temperature operating conditions. The rope gasket may engage the support component along an internal-notch surface.

In some embodiments, the rope-biasing clip may be formed to include a first spring lobe and a second spring lobe. The first spring lobe may be arranged to push the rope gasket generally in a first direction and the second spring lobe may be arranged to push the rope gasket generally in a second direction perpendicular to the first direction.

In some embodiments, each spring lobe may have a concave surface and an opposing convex surface. The concave surfaces of the rope-biasing clip may cooperate with surfaces defining the notch in the support component to define a cavity.

In some embodiments, the first spring lobe may be arranged adjacent to the gap on a first side of the notch and may be formed to include a plurality of apertures extending from the concave surface to the opposing convex surface so that the cavity is in fluid communication with the gap extending from the first side of the notch. The rope gasket may engage the support component along a second side of the notch so that the gap extending from the second side of the notch is blocked from fluid communication with the cavity.

In some embodiments, each spring lobe may have a U-shaped cross-section. In some embodiments, each spring lobe may have a V-shaped cross-section.

In some embodiments, the rope-biasing clip may be formed to include a spring lobe and a rope-retainer flange arranged to extend from the spring lobe. The spring lobe may have a concave side arranged to face away from the rope gasket and an opposing convex side arranged to engage the rope gasket. The rope-retainer flange may be arranged to block the rope gasket from movement away from the convex side of the spring lobe.

According to another aspect of the present disclosure, a gas turbine engine assembly may include a support component formed to include a notch, an engine component, and a seal. The engine component may be mounted in spaced-apart relation to the support component so that a gap is formed between the support component and the engine component and so that the notch opens into the gap.

In some embodiment, the seal may include a rope gasket arranged to block gasses from passing through the gap and a rope-biasing clip arranged between the support component and the rope gasket to push the rope gasket toward engagement with the engine component. The rope-biasing clip may be formed to include a first spring lobe and a second spring lobe that cooperate with surfaces defining the notch in the support component to define a cavity. The first lobe may be formed to include a plurality of apertures extending through the first lobe so that the cavity is in fluid communication with the gap extending from a first side of the notch.

In some embodiments, the rope gasket may engage the support component and the engine component. The rope gasket may engage the support component along an internal-notch surface.

In some embodiments, each spring lobe may have a concave surface and an opposing convex surface. The concave surfaces of the rope-biasing clip may cooperate with surfaces defining the notch to define the cavity.

In some embodiments, each spring lobe may have a U-shaped cross-section. In some embodiments, each spring lobe may have a V-shaped cross-section.

In some embodiments, the rope gasket may engage the support component along a second side of the notch so that the gap extending from the second side of the notch is blocked from fluid communication with the cavity. The gap extending from the first side of the notch may be arranged to receive relatively high pressure gas and the gap extending from the second side of the notch may be arranged to receive relatively low pressure gas.

According to another aspect of the present disclosure, a method of assembling a gas turbine engine assembly is disclosed. The method may include positioning a rope-biasing clip in a notch formed by an support component so that the rope-biasing clip engages the notch along a first side of the notch and provides a rope-receiving channel generally facing away from the first side of the notch. The method may also include positioning a rope gasket in the rope-receiving channel formed by the rope-biasing clip so that a portion of the rope gasket engages with a second side of the notch and a portion of the rope gasket extends out of the notch. The method may also include mounting an engine component relative to the support component so that a gap is formed between the support component and the engine component and so that the rope gasket engages the engine component to block gasses from passing through the gap.

In some embodiments, the spring-biasing clip may be formed to include a first spring lobe and a second spring lobe that cooperate with surfaces defining the notch in the support component to define an annular cavity. The first lobe may be arranged to engage the first side of the notch and may be formed to include a plurality of apertures extending through the first lobe so that the cavity is in fluid communication with the gap extending from the first side of the notch.

These and other features of the present disclosure will become more apparent from the following description of the illustrative embodiments.

DETAILED DESCRIPTION

Figure 1:
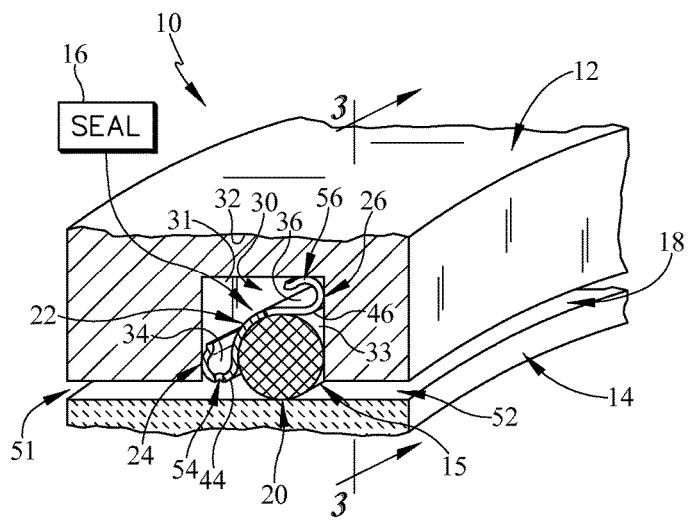
FIG. 1 is a perspective view of a portion of a gas turbine engine assembly including a support component formed to include a notch, an engine component spaced from the support component to create a gap, and a seal arranged between the support component and the engine component to block gasses from passing through the gap.

For the purposes of promoting an understanding of the principles of the disclosure, reference will now be made to a number of illustrative embodiments shown in the drawings and specific language will be used to describe the same.

An illustrative gas turbine engine assembly 10 includes a support component 12, an engine component 14, and a seal 16 as shown in FIG. 1. The support component 12 is illustratively made from a metallic material. The engine component 14 is made from a ceramic or other material adapted to withstand high temperatures. The seal 16 is arranged between the support component 12 and the engine component 14 to block gasses from passing through a gap 18 formed between the support component 12 and the engine component 14.

In the illustrative embodiment, the engine component 14 is mounted in spaced-apart relation to the support component 12 so that the gap 18 is formed as shown in FIG. 1. By spacing the metallic support component 12 apart from at least a portion of the high-temperature composite engine component 14, the metallic support component 12 avoids (at least some) direct conductive heat transfer from the engine component 14. The gap 18 also allows for variations in manufacturing tolerance of the adjacent components 12, 14 for expansion/contraction of the adjacent components 12, 14 that occurs during operation of a gas turbine engine including the assembly 10.

The seal 16 is illustratively adapted to compress/expand to fill the gap 18 during expansion/contraction of the adjacent components 12, 14 that occurs during operation of a gas turbine engine including the assembly 10 as suggested in FIG. 1. The seal 16 includes a rope gasket 20 and a rope-biasing clip 22. The rope gasket 20 is constructed from ceramic materials adapted to withstand high temperatures and is arranged to engage the support component 12 and the engine component 14 along the gap 18 to block gasses from passing through the gap 18. The rope-biasing clip 22 is constructed from a metallic material and is configured to push the rope gasket 20 axially into engagement with the support component 12 and radially into engagement with the engine component 14.

The support component 12 is formed to include a notch 15 that receives the seal 16 to locate the seal 16 as shown, for example, in FIG. 1. The rope gasket 20 extends out from inside the notch 15 and across the gap 18 to engage the engine component 14 and block gasses from passing through the gap 18. The rope-biasing clip 22 is arranged inside the notch 15 and pushes the rope gasket 20 axially and radially so that the rope gasket 20 is retained in position. Both the rope gasket 20 and the rope-biasing clip 22 are compressible so that the seal 16 can accommodate growth or shrinkage of the gap 18.

Figure 3:
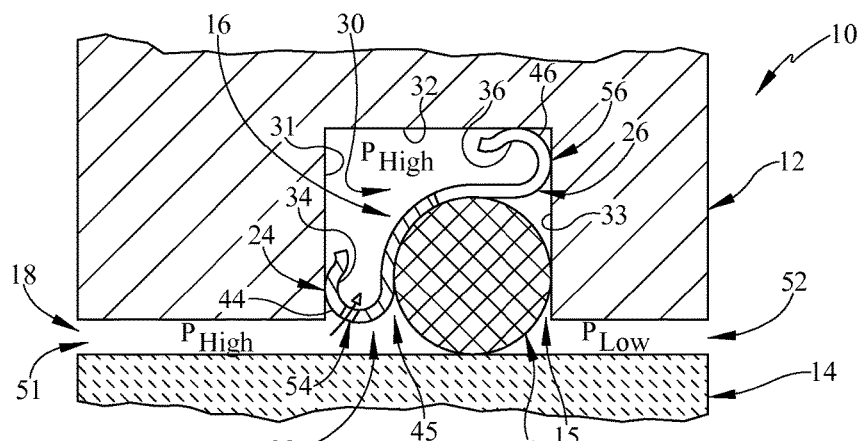
FIG. 3 is a cross-sectional view of the gas turbine engine assembly of FIG. 1 taken along line 3-3 showing that the rope-biasing clip is formed to include two spring lobes having a U-shaped cross-section that cooperate with the notch to form a cavity that in fluid communication with a high pressure side of the gap so that the pressure on the high pressure side of the gap assists the rope-biasing spring clip in pushing the rope gasket into contact with the support component and the engine component.

The rope-biasing clip 22 illustratively pushes the rope gasket 20 into place while maintaining a spaced apart relationship with the engine component 14 as shown in FIG. 3. By maintaining space between the metallic rope-biasing clip 22 and the high-temperature composite engine component 14, the rope-biasing clip 22 avoids direct conductive heat transfer from the engine component 14. The rope-biasing clip 22 is formed to include an inner spring lobe 24 and an outer spring lobe 26. The inner spring lobe 24 is arranged between a first side surface 31 of the notch 15 and the rope gasket 20 so that the inner spring lobe 24 pushes the rope gasket 20 in the axial direction toward a second side surface 33 (opposite the first side surface 31) of the notch 15. The outer spring lobe 26 is arranged between a top surface 32 of the notch 15 and the rope gasket 20 so that the outer spring lobe 26 pushes the rope gasket 20 in the radial direction toward the engine component 14.

Each spring lobe 24, 26 illustratively has an arcuate, generally U-shaped cross-section so that each spring lobe 24, 26 forms corresponding concave surfaces 34, 36 and convex surfaces 44, 46 as shown in FIG. 3. The concave surfaces 34, 36 generally face the support component 12 and into the notch 15 as shown in FIGS. 1 and 3. The concave surfaces 34, 36 of the rope-biasing clip 22 cooperate with a first side surface 31 and the top surface 32 of the notch 15 to define a cavity 30 as shown in FIGS. 1 and 3. The convex surfaces 44, 46 generally face the engine component 14 and engage the rope gasket 20 to push the rope gasket 20 toward the engine component 14. More particularly, the convex surfaces 44, 46 cooperate to form a gasket-receiving channel 45 between the spring lobes 24, 26 that receives a portion of the rope gasket 20 and pushes the rope gasket 20 into contact with the second side surface 33 of the notch 15 and with the engine component 14.

The inner spring lobe 24 is arranged adjacent to the gap 18 on a first side of the notch 15 so that the inner spring lobe 24 is in fluid communication with a high-pressure filled portion 51 of the gap 18 as shown in FIG. 3. The inner spring lobe 24 is formed to include a plurality of apertures 54 that extend through the inner spring lobe 24 from the concave surface 34 to the convex surface 44. The apertures 54 provide fluid communication from the high-pressure filled portion 51 of the gap to the cavity 15 defined by the concave surfaces 34, 44 of the spring lobes 24, 26 so that high pressure gas from the high-pressure portion 51 of the gap 18 fills the cavity 15 to aid the rope-biasing clip 22 in pushing the rope gasket 20 into position. Thus, even if the spring stiffness of the metallic rope-biasing clip 22 is diminished as operating temperatures rise, pressure from the high-pressure filled portion 51 of the gap 18 encourages the rope-biasing clip 22 to retain its shape and push the rope gasket 20 into position.

Figure 2:
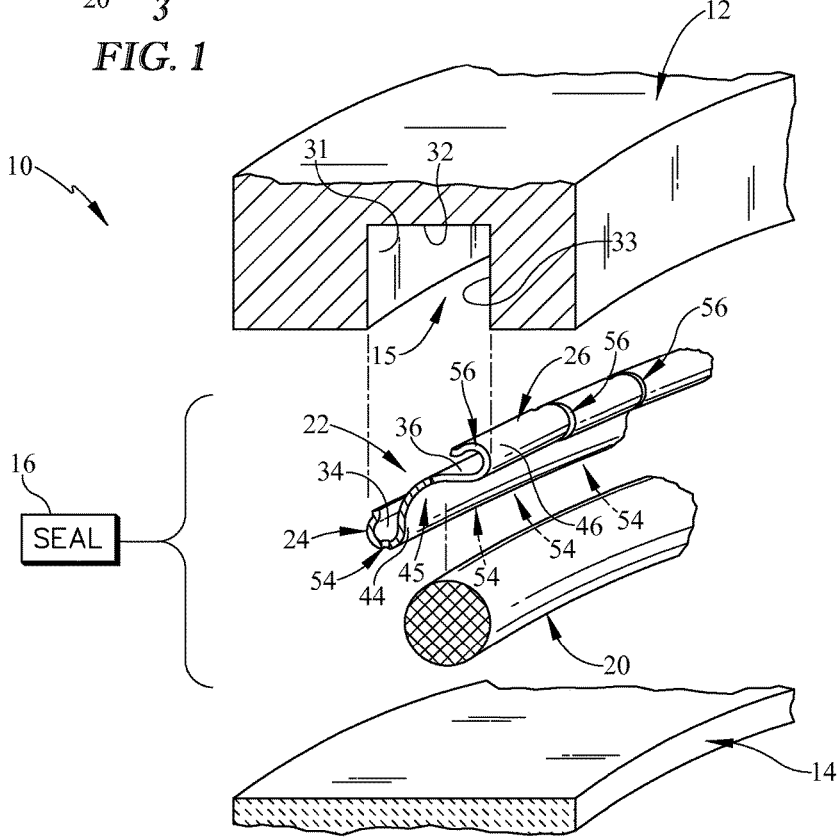
FIG. 2 is an exploded perspective view of the gas turbine engine assembly of FIG. 1 showing that the seal includes a rope gasket and a rope-biasing clip that pushes the rope gasket into contact with the support component and the engine component.

The outer spring lobe 26 is formed to include a plurality of slots 56 that extend through the outer spring lobe 26 from the concave surface 36 to the convex surface 46 as shown, for example, in FIGS. 2 and 3. The slots 56 allow the rope-biasing clip 22 to be bent into a generally circular shape as suggested in FIGS. 1 and 2. The rope gasket 20 blocks high pressure gasses in the cavity 15 from moving through the slots 56 into a low-pressure filled portion 52 of the gap 18 as shown in FIG. 3. Thus, in general, the high-pressure filled portion 51 of the gap 18 extends in a first direction from the notch 15 and the low-pressure filled portion 52 of the gap 18 extends in a second direction (opposite the first direction) from the notch 15.

In the illustrative embodiment, the gas turbine engine assembly 10 is annular and extends around a central axis of a gas turbine engine as suggested in FIG. 1. In other embodiments, the gas turbine engine assembly 10 may be a semi-annular component, may be a generally flat component, or may have another shape.

One illustrative method of assembling the gas turbine engine assembly 10 includes positioning the rope-biasing clip 22 in the notch 15 of the support component 12 so that the rope-biasing clip 22 engages the notch 15 along the first side surface 31 of the notch 15. The rope-biasing clip 22 is further positioned in the notch 15 so that rope-receiving channel 45 generally faces away from the first side surface 31 of the notch 15. The method also includes positioning the rope gasket 20 in the rope-receiving channel 45 so that a portion of the rope gasket 20 engages second side surface 33 of the notch 15 and a portion of the rope gasket 20 extends out of the notch 15. The method also includes mounting the engine component 14 relative to the support component 12 so that the gap 18 is formed and so that the rope gasket 20 engages the engine component 14 to block gasses from passing through the gap 18.

An example of a specific gas turbine engine assembly 10 that may include a metallic support component 12 and a ceramic engine component 14 is a gas turbine engine combustor in which a metallic shell is used along with a ceramic liner adapted to shield the metallic shell from heat generated inside the combustor. Another example of a specific assembly that may include a metallic support component 12 and a ceramic engine component 14 is a turbine wheel shroud in which a metallic carrier is used along with a ceramic runner that shields the metallic carrier from a turbine gas path.

Figure 4:
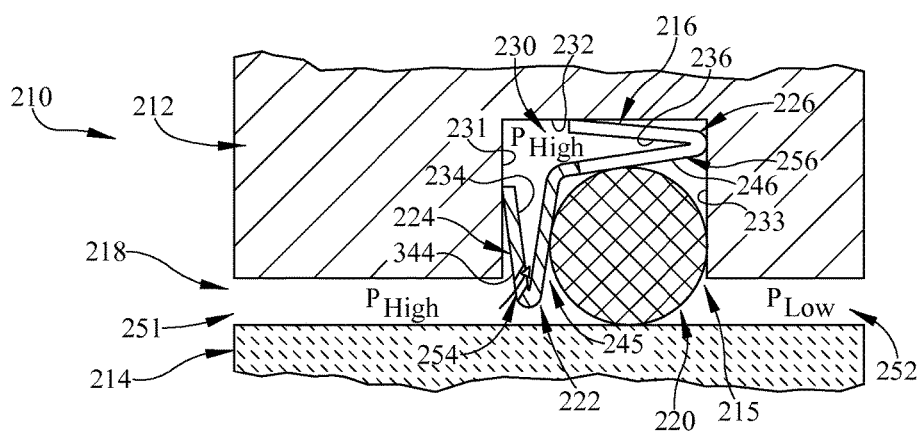
FIG. 4 is a cross-sectional view of another gas turbine engine assembly showing that the rope-biasing clip is formed to include two spring lobes having a V-shaped cross-section that cooperate with the notch to form a cavity that in fluid communication with a high pressure side of the gap so that the pressure on the high pressure side of the gap assists the rope-biasing spring clip in pushing the rope gasket into contact with the support component and the engine component.

Another illustrative gas turbine engine assembly 210 is shown in FIG. 4. The gas turbine engine assembly 210 is substantially similar to the gas turbine engine assembly 10 shown in FIGS. 1-3 and described herein. Accordingly, similar reference numbers in the 200 series indicate features that are common between the gas turbine engine assembly 10 and the gas turbine engine assembly 210. The description of the gas turbine engine assembly 10 is hereby incorporated by reference to apply to the gas turbine engine assembly 210, except in instances when it conflicts with the specific description and drawings of gas turbine engine assembly 210.

Unlike gas turbine engine assembly 10, the rope-biasing clip 222 included in the seal 216 has inner and outer spring lobes 224, 226 with V-shaped cross-sections as shown in FIG. 4. The inner spring lobe 224 is adapted to push the rope gasket 220 toward a second side surface 233 (opposite the first side surface 231) of the notch 215. The outer spring lobe 226 is adapted to push the rope gasket 220 toward the engine component 214.

Figure 5:
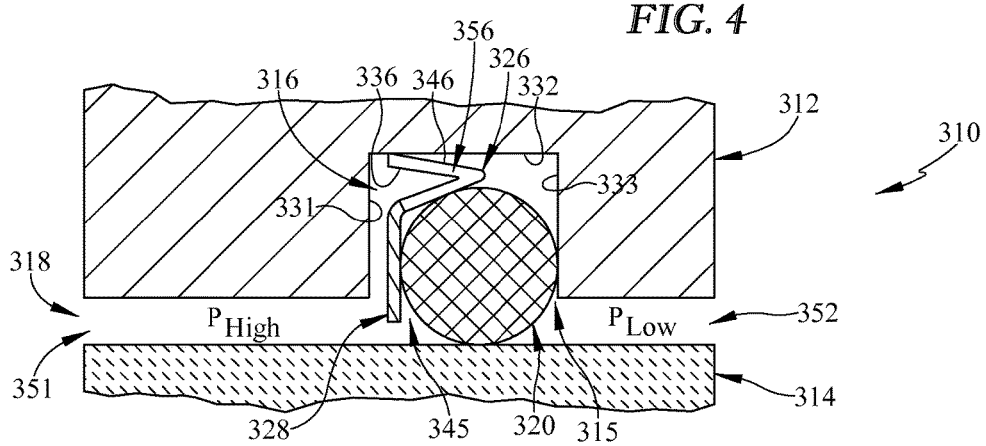
FIG. 5 is a cross-sectional view of yet another gas turbine engine assembly showing that a rope-biasing clip included in the gas turbine engine assembly is formed to include one spring lobe having a V-shaped cross-section and a rope-retainer flange extending from the spring lobe, the spring lobe arranged to form a concave surface in fluid communication with a high pressure side of the gap so that the pressure on the high pressure side of the gap assists the rope-biasing spring clip in pushing the rope gasket into contact with the engine component.

Another illustrative gas turbine engine assembly 310 is shown in FIG. 5. The gas turbine engine assembly 310 is substantially similar to the gas turbine engine assembly 10 shown in FIGS. 1-3 and described herein. Accordingly, similar reference numbers in the 300 series indicate features that are common between the gas turbine engine assembly 10 and the gas turbine engine assembly 310. The description of the gas turbine engine assembly 10 is hereby incorporated by reference to apply to the gas turbine engine assembly 310, except in instances when it conflicts with the specific description and drawings of gas turbine engine assembly 310.

Unlike the gas turbine engine assembly 10, the rope-biasing clip 322 included in the seal 316 has an outer spring lobe 326 and a rope-retainer flange 328 extending radially from the outer spring lobe 326 as shown in FIG. 5. The outer spring lobe 326 is adapted to push the rope gasket 320 toward the engine component 314. The rope-retainer flange 328 blocks the rope gasket 320 from moving axially out of position relative to the outer spring lobe 326 so that the outer spring lobe 326 pushes the rope gasket 320 into contact with the engine component 314.

The outer spring lobe 326 illustratively has a V-shaped cross-section as shown in FIG. 5. In other embodiments, the outer spring lobe 326 may have a U-shaped cross-section similar to the outer spring lobe 26 of the rope-biasing clip 22 included in the gas turbine engine assembly 10.

The rope-retainer flange 328 is spaced apart from the first side surface 331 of the notch 315 and allows fluid communication from the high-pressure filled portion 351 of the gap 318 with the concave surface 336 of the outer spring lobe 326. The high pressure gas aids the rope-biasing clip 322 in pushing the rope gasket 320 into contact with the engine component 314.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine assembly comprising
a support component formed to include a notch,
an engine component, the engine component mounted in spaced-apart relation to the support component so that a gap is formed between the support component and the engine component and so that the notch opens into the gap, and
a seal adapted to close the gap, the seal including a rope gasket arranged to block gasses from passing through the gap and a rope-biasing clip arranged between the support component and the rope gasket to push the rope gasket toward engagement with the engine component, the rope-biasing clip being formed to include a first spring lobe and a second spring lobe that cooperate with notch surfaces defining the notch in the support component to define a cavity,
wherein a first portion of the gap between the support component and the engine component extends from a first side of the notch and is arranged to receive a first portion of the gasses at a first pressure, a second portion of the gap between the support component and the engine component extends from a second side of the notch opposite the first side of the notch and is arranged to receive a second portion of the gasses at a second pressure, and the second pressure is lower than the first pressure such that the notch is configured to be pressurized by the first portion of the gasses from the first portion of the gap that extends from the first side of the notch.

2. The gas turbine engine assembly of claim 1, wherein the rope gasket engages the support component along an internal-notch surface.

3. The gas turbine engine assembly of claim 1, wherein each of the first and second spring lobes has a concave surface and an opposing convex surface and the concave surfaces of the rope-biasing clip cooperate with the notch surfaces defining the notch to define the cavity.

4. The gas turbine engine assembly of claim 3, wherein each of the first and second spring lobes has a U-shaped cross-section.

5. The gas turbine engine assembly of claim 3, wherein each of the first and second spring lobes has a V-shaped cross-section.

6. The gas turbine engine assembly of claim 1, wherein the rope gasket engages the support component along the second side of the notch so that the gap extending from the second side of the notch is blocked from fluid communication with the cavity.

7. A method of assembling a gas turbine engine assembly comprising
positioning a rope-biasing clip in a notch formed by a support component so that the rope-biasing clip engages the notch along a first side of the notch, wherein the rope-biasing clip provides a rope-receiving channel,
positioning a rope gasket in the rope-receiving channel formed by the rope-biasing clip so that a first portion of the rope gasket engages with a second side of the notch and a second portion of the rope gasket extends out of the notch, and
mounting an engine component relative to the support component so that a gap is formed between the support component and the engine component and so that the rope gasket engages the engine component to block gasses from passing through the gap, wherein a first portion of the gap between the support component and the engine component extends from a first side of the notch and is arranged to receive a first portion of the gasses at a first pressure, a second portion of the gap between the support component and the engine component extends from a second side of the notch opposite the first side of the notch and is arranged to receive a second portion of the gasses at a second pressure, and the second pressure is lower than the first pressure such that the notch is configured to be pressurized by the first portion of the gasses from the first portion of the gap extending from the first side of the notch.

* * * * *